US007548764B2

(12) United States Patent
Jin et al.

(10) Patent No.: US 7,548,764 B2
(45) Date of Patent: Jun. 16, 2009

(54) METHOD AND SYSTEM FOR GENERATING MULTIPLE RADIATION PATTERNS USING TRANSFORM MATRIX

(75) Inventors: Hang Jin, Plano, TX (US); Brian L. Kurtz, Addison, TX (US); Weidong Yang, Plano, TX (US); Daniel Wee, Garland, TX (US); Phil Davis, Richardson, TX (US); John Grabner, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 490 days.

(21) Appl. No.: 11/346,762

(22) Filed: Feb. 3, 2006

(65) Prior Publication Data

US 2006/0199615 A1 Sep. 7, 2006

Related U.S. Application Data

(60) Provisional application No. 60/658,839, filed on Mar. 4, 2005.

(51) Int. Cl.
*H04M 1/00* (2006.01)

(52) U.S. Cl. ................ 455/562.1; 455/575.7; 455/63.4; 342/368; 342/373; 343/814; 343/816

(58) Field of Classification Search .............. 455/562.1, 455/424, 425, 456.5, 456.6, 561, 575.1, 550.1, 455/13.3, 63.4, 83, 575.7, 121, 269, 277.1, 455/193.1, 272, 273, 25, 275; 343/797, 757, 343/853, 141, 347, 816, 751, 814, 822, 852, 343/850, 860; 375/148, 267, 299, 347, 130, 375/147, 146, 358, 295; 370/509, 208, 335, 370/342; 342/368, 373, 372, 154, 350
See application file for complete search history.

(56) References Cited

U.S. PATENT DOCUMENTS

| | | | | |
|---|---|---|---|---|
| 5,563,610 | A * | 10/1996 | Reudink | 342/375 |
| 5,642,353 | A * | 6/1997 | Roy et al. | 370/329 |
| 6,067,053 | A * | 5/2000 | Runyon et al. | 343/797 |
| 6,218,987 | B1 * | 4/2001 | Derneryd et al. | 342/373 |
| 6,347,234 | B1 * | 2/2002 | Scherzer | 455/562.1 |
| 7,139,328 | B2 * | 11/2006 | Thomas et al. | 375/299 |

(Continued)

OTHER PUBLICATIONS

PCT International Search Report and Written Opinion of the Internatonal Searching Authority, Aug. 31, 2007.

*Primary Examiner*—Duc Nguyen
*Assistant Examiner*—Charles Chow
(74) *Attorney, Agent, or Firm*—Edell, Shapiro & Finnan, LLC

(57) ABSTRACT

Techniques are provided herein for generating multiple radiation patterns. An antenna system comprises an antenna array having one or more antennas for providing a first radiation pattern and a second radiation pattern, a transform matrix for transforming one or more inputs into one or more outputs according to a transform function, wherein the outputs of the transform matrix provide signals to the antennas with predetermined phases and magnitudes for generating the first and second radiation patterns, and a transmitter for providing a first set of signals corresponding to the first radiation pattern and a second set of signals corresponding to the second radiation pattern to inputs of the transform matrix.

20 Claims, 4 Drawing Sheets

U.S. PATENT DOCUMENTS

| | | | | |
|---|---|---|---|---|
| 7,245,938 | B2 * | 7/2007 | Sobczak et al. | 455/562.1 |
| 2003/0073463 | A1 * | 4/2003 | Shapira | 455/562 |
| 2003/0216156 | A1 * | 11/2003 | Chun | 455/562.1 |
| 2004/0160374 | A1 * | 8/2004 | Johansson et al. | 343/757 |
| 2006/0093055 | A1 * | 5/2006 | Goldberg | 375/267 |
| 2006/0270393 | A1 * | 11/2006 | Sheen et al. | 455/416 |

* cited by examiner

METHOD AND SYSTEM FOR GENERATING MULTIPLE RADIATION PATTERNS USING TRANSFORM MATRIX

CROSS REFERENCE

This application claims the benefits of U.S. Patent Application Ser. No. 60/658,839, which was filed on Mar. 4, 2005 and entitled "Using Transform Matrix to Generate Multiple Desired Radiation Patterns."

FIELD OF THE INVENTION

This invention relates generally to antenna systems, and more particularly to the use of a transform matrix of an antenna array to generate multiple radiation patterns.

BACKGROUND

In communication systems, whether they conform to GSM, CDMA, or other technology standards, the communications between the base stations and the mobile terminals typically include one or more traffic channels for communicating data signals and one or more control channels for exchanging control signals. For some signal control channels, for example, a pilot channel of CDMA systems, the control signals have to be broadcasted omni-directionally to cover the whole or sectored cell. On the other hand, it is desirable to steer narrow beams formed for communicating through traffic channels with specified mobile equipment without interfering with other mobile equipment nearby. The beam formed pattern is directed to particular users, and it has a narrow beam width.

Logically, this can be done by two approaches: the first approach is to generate the beamforming pattern via one set of antennas and generate the omni pattern via another set of antennas. The second approach is to use a single set of antennas but the omni pattern needs to be synthesized with the beamforming pattern. However, the first approach will add the costs associated with the omni pattern generation. The physical arrangement of two antenna sets also adds some difficulties to the first approach. There are discussions about beam forming and omni broadcast synthesis issues. The difficulties of synthesizing omni-broadcast patterns with beam forming means remain as challenges awaiting newer and better engineering solutions.

Therefore, there exists a need to provide an improved approach that allows antenna arrays to provide both beam forming and omni patterns simultaneously without the need of either an additional antenna set for omni pattern or omni pattern synthesis.

SUMMARY

A system and method for generating multiple radiation patterns is disclosed here. An antenna system comprises an antenna array having one or more antennas for providing a first radiation pattern and a second radiation pattern, a transform matrix for transforming one or more inputs into one or more outputs according to a transform function, wherein the outputs of the transform matrix provide signals to the antennas with predetermined phases and magnitudes for generating the first and second radiation patterns, and a transmitter for providing a first set of signals corresponding to the first radiation pattern and a second set of signals corresponding to the second radiation pattern to inputs of the transform matrix.

One object of this present invention is to provide an antenna system, which comprises an antenna array having N antennas for providing a first radiation pattern having a narrow beam width and a second radiation pattern having a wide beam width, a transform matrix for transforming N input ends into N output ends according to a transform function M, and a transmitter. The N outputs of the transform matrix provide signals to the N antennas with predetermined phases and magnitudes for generating the first and second radiation patterns. The transmitter is configured to provide a first set of signals to the N inputs of the transform matrix corresponding to the first radiation pattern and a second set of signals corresponding to the second radiation pattern. The transform matrix combines the first and second sets of the signals for generating the predetermined phases and magnitudes needed for the first and second radiation patterns.

Another object of this invention is to disclose a method for generating multiple radiation patterns. The method comprises after determining a first output weight corresponding to a first radiation pattern having a first beam width and a second output weight corresponding to a second radiation pattern having a second beam width to be transmitted by the antenna array, first and second input weights are obtained based on a transform function of a predetermined transform matrix coupled to the antenna array and the first and second output weights. A first and second set of input signals are then generated corresponding to the first and second radiation patterns to be programmed with the first and second input weights respectively.

DETAILED DESCRIPTION OF THE INVENTION

Although the present invention is illustrated below with regard to a few limited examples, it is understood that the present invention is applicable to any multiple access technologies. Such access technologies include Frequency Division Multiple Access (FDMA), Time Division Multiple Access (TDMA), Code Division Multiple Access (CDMA), and Orthogonal Frequency Division Multiplex (OFDM) systems and any combination thereof, whether synchronized or unsynchronized, using Frequency Division Duplex (FDD) or Time Division Duplex (TDD).

Figure 1:
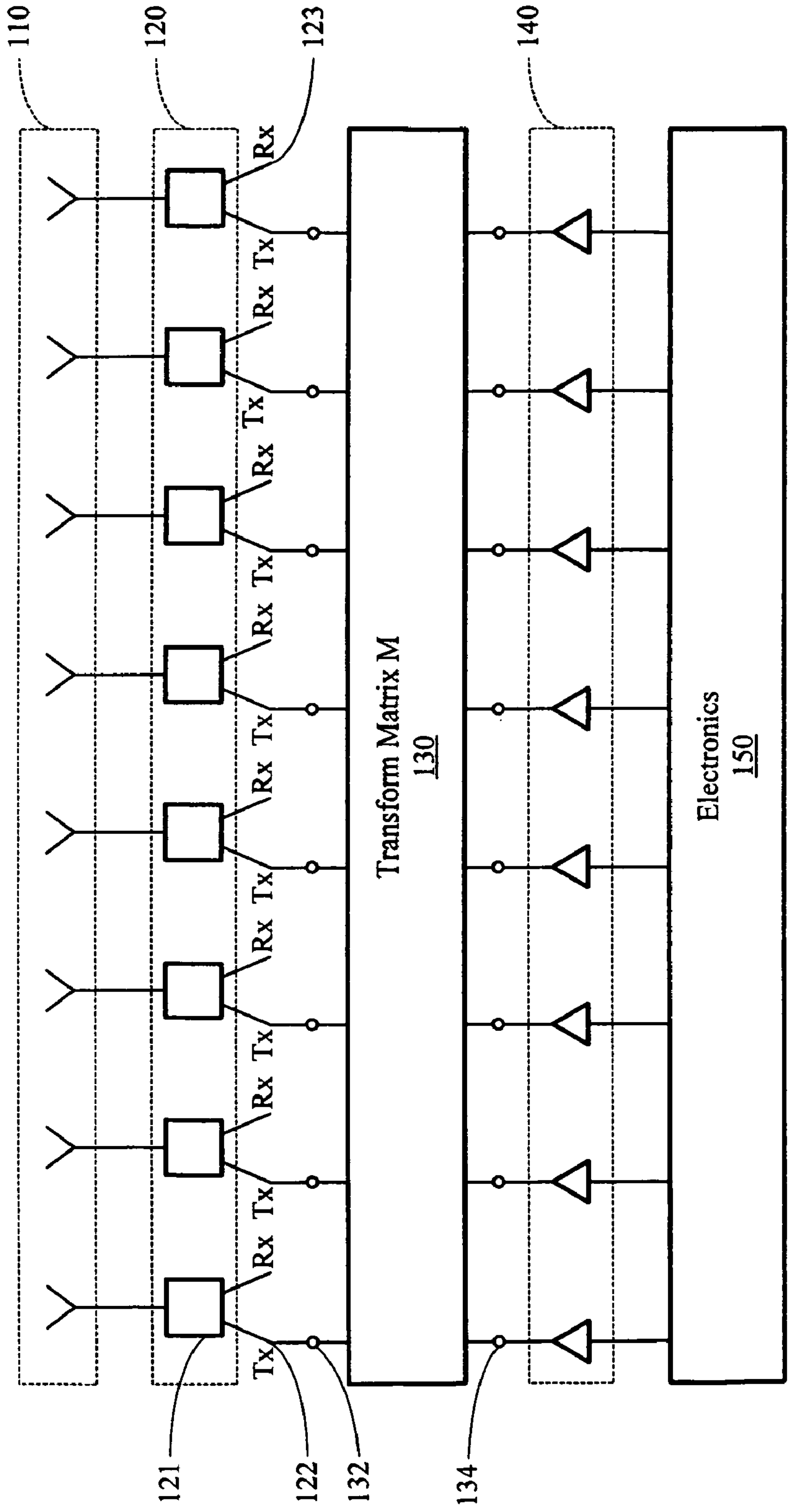
FIG. 1 is a schematic diagram depicting a typical base station in accordance with one embodiment of the present invention.

FIG. 1 illustrates an antenna system 100, which is a part of a base station, in accordance with one embodiment of the present invention. The antenna system 100 comprises at least one antenna array 110, a Tx/Rx duplexer array 120, a transform matrix 130, a transmitter 140, and an electronic circuit module 150. The antenna array 110 comprises a plurality of antennas 110 for full cell 360 degree coverage or sectored cell coverage, such as 120 degrees. Besides, the antenna array 110 is connecting to the transform matrix 130 via a duplexer ends 121 of the Tx/Rx duplexer array 120, which may be implemented as a plurality of duplexers, circulators, or switchers corresponding to each of the antennas 110. The receiving ends 123 of the Tx/Rx duplexer array 120 are connected to receivers (not shown) of the base station 100. The transmission ends 122 of the Tx/Rx duplexer array 120 are connected to the output ends 132 of the transform matrix 130. On the other hand, the input ends 134 of the transform matrix 130 are connected to the transmitter 140, which is controlled by the electronic circuit module 150 of the base station 110. Moreover, since the number of input ends 134 and output ends 132 of the transform matrix 130 are identical, the transform matrix 130 could be denoted as an N×N transform matrix 130. In such case, the transform function of this N×N transform matrix 130 from the input ends 134 to the output ends 132 could be denoted as M. The inverse transform function of this N×N transform matrix 130 from the output ends 132 to the input ends 134 could be denoted as inv(M) or $\overline{M}$.

As an example, assuming that the number of antennas 110 of this antenna array 110 is eight, it implies that N is equaled to 8. In order to generate a first desired radiation pattern, denoted as $N_1$, an N×1 vectored signal weight, denoted as $W_1$ with appropriate phases and magnitudes corresponding to this first radiation pattern $N_1$, has to be fed into the transmission ends 122 from the output ends 132 of the transform matrix 130. Likewise, in order to generate the i-th desired radiation pattern, denoted as $N_i$, a corresponding vectored signal weight, $W_i$, may be fed into the transmission ends 122 and then fed into the antenna array 110.

The vectored signal weight, $W_i$, for each radiation pattern, $N_i$, can be determined according to the properties of previous signals exchanged in the communication system in the past or based upon some certain criteria. For example, a vectored signal weight steering narrow-formed beam to a specified mobile terminal is determined by identifying incoming direction of the specified mobile terminal's transmission. In another example, a predetermined vectored signal is determined after the antenna array 110 is physically settled in order to broadcast omni-directionally. The outputted signals of the transmitter 140 could be combined and placed in one or two of the output ends 132 as well as the corresponding antennas 110 by the transform matrix 130.

Since the transform matrix equation M and its inverse transform equation $\overline{M}$are known and the intended vectored signal weights could be determined dynamically or statically, vectored inputs $W_i'$, corresponding to each vectored signal weight $W_i$, of the transmitter 140 could be calculated accordingly as follows:

$$W_i' = \overline{M} * W_i$$

the equation above is derived from the following transformation equation:

$$W_i = M * W_i'$$

wherein $W_i'$ is a 1×N vector corresponding to the N×1 vector of $W_i$. Supposing that $W_o$ and $W_b$are weights for frequency or time diverse signals, $W_o$ is usually for common control and $W_b$ is dedicated for traffic signals. For the purpose of common control broadcast, the radiation pattern generated with $W_o$ has a wide beam width. On the other hand, the radiation pattern generated with $W_b$ has a narrow beam width. Therefore, by applying the inverse transform equations above, $W_o'$ and $W_b'$ could be generated and applied by the base station to N signals, which are then fed to the input ends 134 of the transform matrix 130 to generate radiation patterns with the original required weights $W_0$ and $W_b$. This process assures that the desired two different patterns with expected weights are produced.

After the transform function M provided by the transform matrix 130, two intended radiation patterns generated with appropriate weights $W_b$ and $W_o$ are going to the transmission ends 122 of the Tx/Rx duplexer array 120 from the output ends 132 of the transform matrix 130. Therefore, the radio frequency signals emitted by the antennas 110 of the antenna array 110 could be formed in a narrow beam width and a wide beam width simultaneously.

Figure 2:
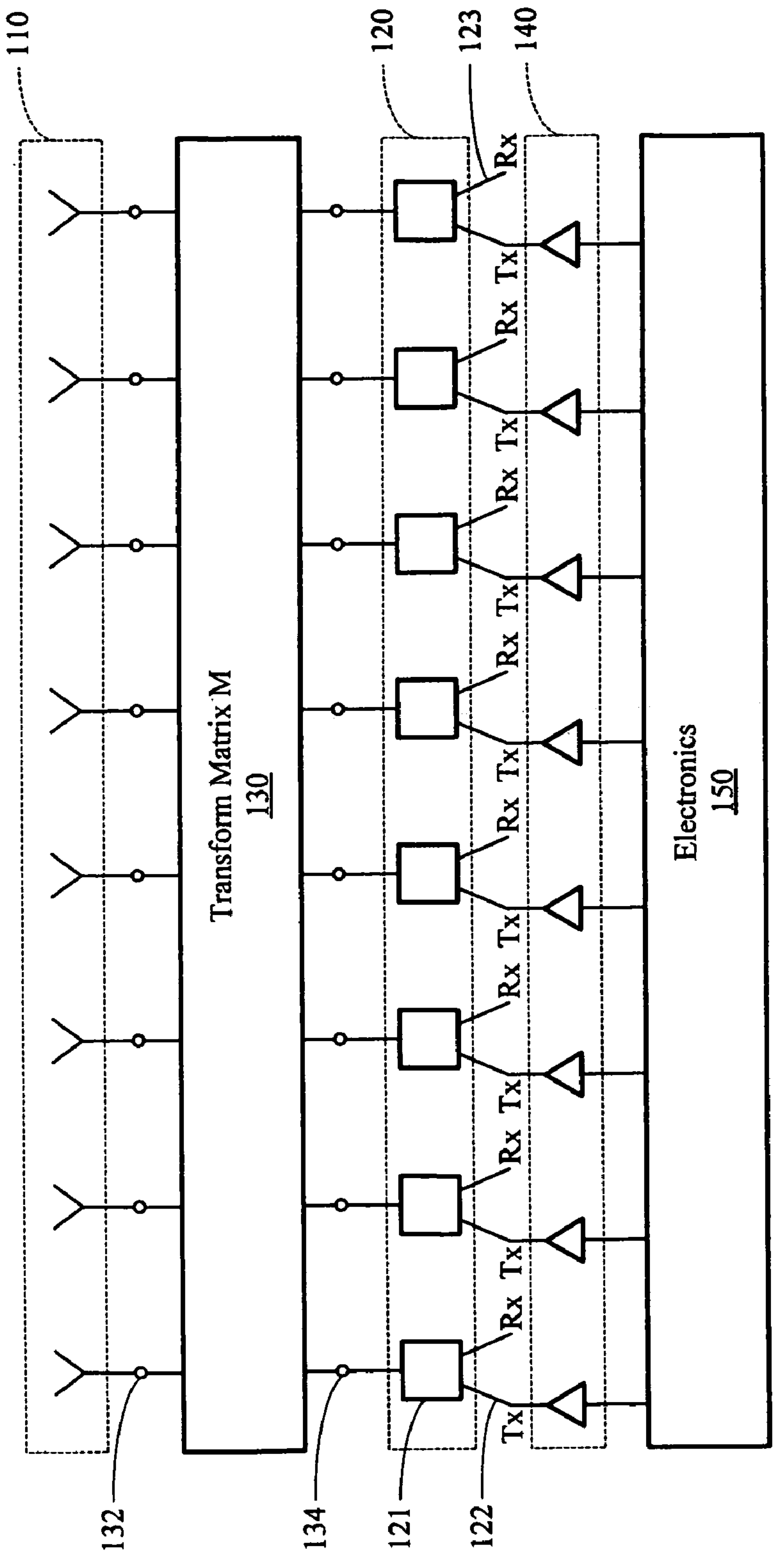
FIG. 2 is a schematic diagram illustrating another arrangement of the typical base station shown in the FIG. 1

FIG. 2 illustrates another arrangement of the typical base station 100 according to another embodiment of the present invention. In the embodiment shown in FIG. 1, the antenna array 110 is connected to the transform matrix 130 via the Tx/Rx duplexer array 120. However, in this embodiment shown in FIG. 2, the antenna array 110 is directly connected to the output ends 132 of the transform matrix 130. Besides, the input ends 134 of the transform matrix 130 are coupled to the duplexer ends 121 of the Tx/Rx duplexer array 120. Finally, the transmission ends 122 of the Tx/Rx duplexer array 120 are coupled to the transmitter 140. As illustrated above, the present invention allows that the duplex function of transmission and receiver to be performed before or after the transform function M.

Figure 3:
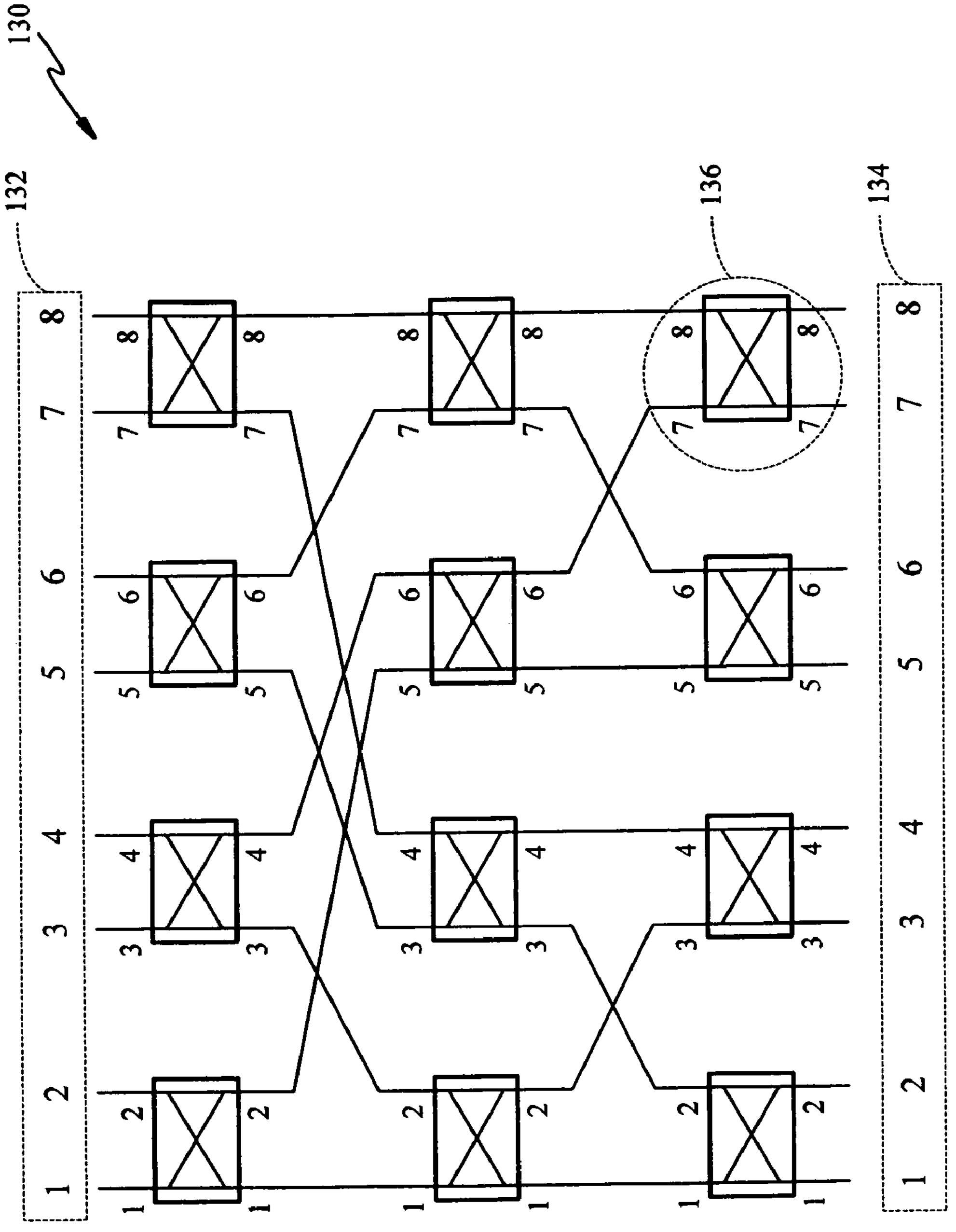
FIG. 3 is a diagram depicting a transform matrix in accordance with one embodiment of the present invention.

Please refer to FIG. 3, which depicts a transform matrix 130 of a preferred embodiment in accordance with the present invention. In this regard, the transform matrix 130 is composed by a Butler matrix of 2×2 90 degree hybrids 136. The N×N Butler matrix is a beam forming network using 90 degree hybrids 136 to provide orthogonal beams. In the case of 8×8 transform matrix 130, there are 12 hybrids 136 formed in 3 rows, each row with 4 hybrids. When one of the input ends 134 of the transform matrix 130 is excited by a signal, all the output ends 132 of the transform matrix 130 are equally excited in amplitudes but with a progressive phase between the output ends 132. Since the Butler matrix is well known in telecommunication or electronics industry, it shall be understood comprehensively without further explanation.

Figure 4:
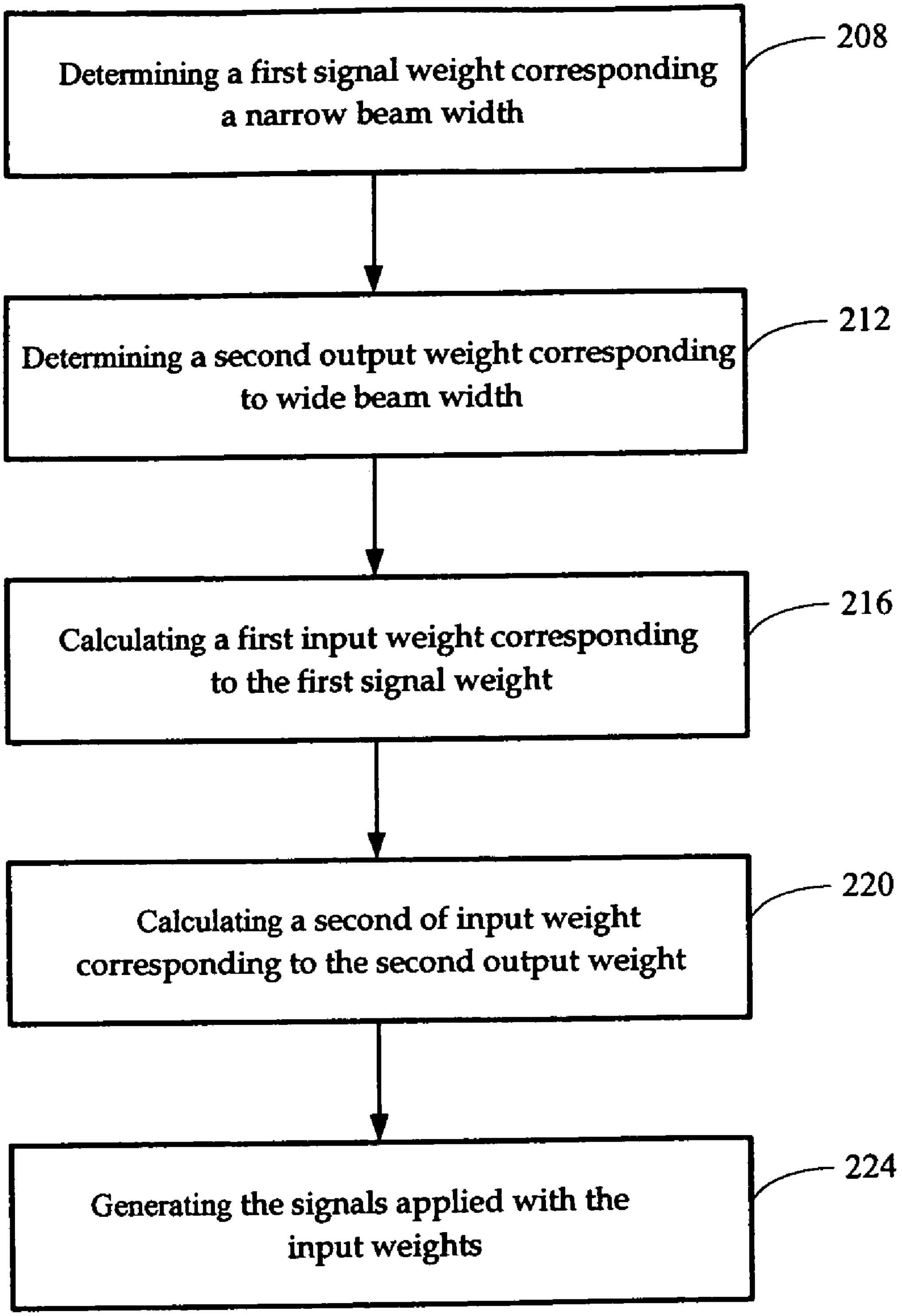
FIG. 4 is a flowchart diagram showing a process for generating weights for different radiation patterns according to one embodiment of the present invention.

Please refer to FIG. 4, which shows a flowchart diagram for using the transform matrix to generate weights for multiple radiation patterns in accordance with an embodiment of the present invention. As illustrated above, the base station comprises an antenna array, a Tx/Rx duplexer array, a transform matrix with a transform function M, and a transmitter. In this example, the antennas of the antenna array are coupled directly to the duplexer ends of the duplexer of the Tx/Rx duplexer array as in FIG. 1. In addition, the transmission ends of the Tx/Rx duplexer array are coupled to the output ends of the transform matrix and the input ends of the transform matrix are coupled to the transmitter. In another example of this embodiment, the antennas of the antenna array are coupled to the output ends of the transform matrix and the input ends of the transform matrix are coupled to the duplexer of the Tx/Rx duplexer array. Moreover, the transmission ends of the Tx/Rx duplexer array are coupled to the transmitter. The transform matrix may be implemented as a Butler matrix with 90 degree hybrids.

In this example, it is assumed that there are two different radiation patterns that are needed, one having a narrow beam width and the other a wide beam width. In order to differentiate the two radiation patterns, they should have their corresponding vector weights. Based on the expected first radiation pattern, a first output vectored signal weight corresponding to the first radiation pattern (e.g., having a narrow beam width) is determined dynamically in step 208. Also in step 212, a second output vectored signal weight of a second radiation pattern (e.g., having a wide beam width) is determined. These two steps may be processed concurrently or in reverse order. It is thus noted that the order of these two steps is not important. Since the transform equation of the transform matrix is known, its inverse function is also determinable. The base station has to generate signal inputs with appropriate input weights so that, when they pass the transform matrix, the output signals from the transform matrix will carry the expected first and second output vectored signal weights to form the two radiation patterns. A first input vectored signal weight could be calculated by applying the inverse of transform function with the first output vectored signal weight in step 216. Similarly, a second input vectored signal weight could be calculated by applying the inverse of transform function with the second output vectored signal weight in step 220. It is also understood that the calculation of the first and second input vectored signal weights in steps 216 and 220 could be done in parallel or in a reverse order. Therefore, in the final step 224, the base station generates the first and second signals corresponding to the first and second radiation patterns with the input vectored signal weights applied therewith. After they are applied with the corresponding weights, the first and second signals become signal vectors of N×, where N is the number of antennas. After combining and feeding these two vector signals through the transform matrix to the antenna array, two desired radiation patterns will be generated.

As an alternative, all inputs to the transform matrix can be combined within the matrix to only generate a single output or a selected number of outputs to be transmitted to a designated antenna or elements. For example, if a particular antenna in the antenna array is designed to transmit the wide beam pattern, the input weights can be adjusted so that signals on other antennas are nulled (e.g., W=[I, 0, 0, 0 . . . 0]). Further, it is also possible that one radiation pattern is generated by the antenna away while the other radiation pattern is only transmitted by one particular antenna within the array. Or, a subset of antennas within the antenna array is producing one pattern, while another subset of the antennas is producing other patterns.

The above disclosure provides many different embodiments, or examples, for implementing different features of the invention. Also, specific examples of components and processes are described to help clarify the invention. For example, the above described process can be applied to generate more than two patterns if needed. These are, of course, merely examples and are not intended to limit the invention from that described in the claims.

While the invention has been particularly shown and described with reference to the preferred embodiment thereof, it will be understood by those skilled in the art that various changes in form and detail may be made therein without departing from the spirit and scope of the invention.

What is claimed is:

1. A system comprising:

an antenna array having one or more comprising a plurality of antennas configured to provide a first narrow beamwidth radiation pattern based on first antennas weights and a second wide beamwidth radiation pattern based on second antenna weights;

a transform matrix configured to be coupled to the antenna array and to transform one or more inputs into one or more outputs according to a transform function that transforms the first antenna weights and second antenna weights into respective first and second input weights that are applied to first and second sets of signals, respectively, to be transmitted, and to output, wherein the outputs of the transform matrix provide signals to the antennas of the antenna array with predetermined phases and magnitudes for generating in order to generate the first narrow beamwidth and second wide beamwidth radiation patterns simultaneously; and a transmitter configured to provide the first set of signals to be transmitted with the first narrow beamwidth radiation pattern and the second set of signals to be transmitted with the second wide beamwidth radiation pattern to inputs of the transform matrix.

2. The system of claim 1, further comprising a transmitter/receiver duplexer array having one or more duplexers configured to duplex a predetermined number of transmission ends with a predetermined number of receiving ends into a predetermined number of duplexer ends.

3. The system of claim 2, wherein the transmission ends are coupled to the outputs of the transform matrix and the duplexer ends are coupled to the antenna array.

4. The system of claim 2, wherein the transmission ends are coupled to the transmitter and the duplexer ends are coupled to the inputs of the transform matrix.

5. The system of claim 1, wherein the transmission matrix is an N×N Butler matrix.

6. The system of claim 1, further comprising an electronic circuit module configured to dynamically determine the magnitudes and phases for generating the first narrow beamwidth or second wide beamwidth radiation patterns according to predetermined properties of previously received signals.

7. The system of claim 1, further comprising an electronic circuit module configured to program the magnitudes and phases in order to produce vectored signal weights for the first narrow beamwidth and for the second wide beamwidth radiation patterns.

8. A method for generating multiple radiation patterns by an antenna array having a predetermined number of antennas, the method comprising determining first output weights corresponding to a first radiation pattern having a narrow beamwidth and a second output weights corresponding to a second radiation pattern having a wide beamwidth to be transmitted by the antenna array;

obtaining a first input weights and a second input weights based on a transform function of a predetermined transform matrix coupled to the antenna array and the first output weights and second output weights and generating a first and second sets of input signals corresponding to the first and second radiation patterns to be programmed with the first input weights and second input weights respectively.

9. The method of claim 8, further comprising passing the first and second sets of input signals through a transmitter/receiver duplexer before they are fed to the transform matrix.

10. The method of claim 8, further comprising passing outputs of the transform matrix through a transmitter/receiver duplexer.

11. The method of claim 8, wherein determining comprises dynamically determining the first output weights corresponding to the first radiation pattern according to properties of previously received signals.

12. The method of claim 8, wherein determining comprises statically determining the second output weights corresponding to the second radiation pattern.

13. The method of claim 8, wherein obtaining further comprises obtaining the first and second input weights for providing one or more selected outputs coupled to one or more predetermined antennas of the antenna array with at least one antenna not receiving any output.

14. A system comprising:

an antenna array comprising a plurality of antennas configured to provide a first radiation pattern for carrying a predetermined traffic channel associated with a predetermined mobile terminal based on first antenna weights and a second radiation pattern for carrying a control channel associated with one or more mobile terminals based on second antenna weights, wherein the first radiation pattern is beamformed for the predetermined mobile terminal and the second radiation pattern is omni-directional within a predetermined coverage area;

a transform matrix configured to be coupled to the antenna array and to transform one or more inputs into one or more outputs according to a transform function that transforms the first antenna weights and second antenna weights into respective first and second input weights that are applied to first and second sets of signals, respectively, to be transmitted, and to output signals to the antennas of the antenna array with predetermined phases and magnitudes in order to generate the first and second radiation patterns simultaneously; and a transmitter configured to provide the first set of signals to be transmitted with the first radiation pattern and the second set of signals to be transmitted with the second radiation pattern to inputs of the transform matrix.

15. The system of claim 14, further comprising a transmitter/receiver duplexer array coupled to the transform matrix and the antennas, having one or more duplexers configured to duplex a predetermined number of transmission ends with a predetermined number of receiving ends into a predetermined number of duplexer ends.

16. The system of claim 15, wherein the transmission ends are coupled to the outputs of the transform matrix and the duplexer ends are coupled to the antenna array.

17. The system of claim 15, wherein the transmission ends are coupled to the transmitter and the duplexer ends are coupled to inputs of the transform matrix.

18. The system of claim 14, wherein the transmission matrix is an N×N Butler matrix.

19. The system of claim 14, further comprising an electronic circuit module configured to dynamically determine the magnitudes and phases for generating the first or second radiation patterns according to predetermined properties of previously received signals.

20. The system of claim 14, further comprising an electronic circuit module configured to program the magnitudes and phases in order to produce vectored signal weights for the first and second radiation patterns.

* * * * *